US012619636B2

(12) United States Patent
Gullapudi et al.

(10) Patent No.: US 12,619,636 B2
(45) **Date of Patent: *May 5, 2026**

(54) ENTITY LINKING AND FILTERING USING EFFICIENT SEARCH TREE AND MACHINE LEARNING REPRESENTATIONS

(71) Applicant: SAP SE, Walldorf (DE)

(72) Inventors: Sundeep Gullapudi, Singapore (SG); Rajesh Vellore Arumugam, Singapore (SG); Matthias Frank, Heidelberg (DE); Wei Xia, Singapore (SG)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/014,340

(22) Filed: Jan. 9, 2025

(65) Prior Publication Data

US 2025/0147989 A1 May 8, 2025

Related U.S. Application Data

(63) Continuation of application No. 17/723,586, filed on Apr. 19, 2022, now Pat. No. 12,277,148.

(51) Int. Cl.

| | |
|---|---|
| ***G06F 16/31*** | (2019.01) |
| ***G06F 16/332*** | (2025.01) |
| ***G06F 16/3332*** | (2025.01) |
| ***G06F 40/284*** | (2020.01) |
| *G06F 16/33* | (2025.01) |

(52) U.S. Cl.

CPC .......... *G06F 16/322* (2019.01); *G06F 16/332* (2019.01); *G06F 16/3334* (2019.01); *G06F 40/284* (2020.01)

(58) Field of Classification Search

CPC .. G06F 16/322; G06F 16/3334; G06F 16/332; G06F 40/284

See application file for complete search history.

(56) References Cited

U.S. PATENT DOCUMENTS

| | | | | |
|---|---|---|---|---|
| 10,380,236 | B1 | 8/2019 | Ganu et al. | |
| 10,783,377 | B2 | 9/2020 | Katti et al. | |
| 11,243,989 | B1 * | 2/2022 | Flanagan | G06F 40/253 |
| 2008/0168135 | A1 * | 7/2008 | Redlich | G06F 21/6254 709/204 |
| 2010/0185668 | A1 * | 7/2010 | Murphy | G06F 16/252 707/E17.014 |

(Continued)

FOREIGN PATENT DOCUMENTS

| | | |
|---|---|---|
| CN | 113282711 | 8/2021 |
| CN | 113656561 | 11/2021 |

OTHER PUBLICATIONS

Christophides et al. ACM Computing Surveys, "End-to-End Entity Resolution for Big Data: A Survey", 2020, teaches identifying different descriptions that refer to the same real-world entity appearing either within or across data sources, when unique entity identifiers are not available. (Year: 2020).*

(Continued)

*Primary Examiner* — Matthew J Ellis
(74) *Attorney, Agent, or Firm* — Fish & Richardson P.C.

(57) ABSTRACT

Methods, systems, and computer-readable storage media for a ML system that reduces a number of target items from consideration as potential matches to a query item using token embeddings and a search tree.

9 Claims, 8 Drawing Sheets

(56) References Cited

U.S. PATENT DOCUMENTS

| | | | | |
|---|---|---|---|---|
| 2013/0173258 | A1 | 7/2013 | Liu et al. | |
| 2014/0067784 | A1* | 3/2014 | Wang | G06F 16/9566 707/706 |
| 2014/0236995 | A1 | 8/2014 | Spindler et al. | |
| 2018/0373791 | A1 | 12/2018 | Yen et al. | |
| 2019/0236132 | A1 | 8/2019 | Zhu et al. | |
| 2020/0005149 | A1 | 1/2020 | Ramanath et al. | |
| 2020/0193511 | A1 | 6/2020 | Saito et al. | |
| 2021/0342711 | A1* | 11/2021 | Mokeev | G06F 16/3347 |
| 2021/0374347 | A1* | 12/2021 | Yang | G06N 3/04 |
| 2022/0245341 | A1* | 8/2022 | Kedia | G06F 40/30 |
| 2022/0277015 | A1 | 9/2022 | Zhang et al. | |
| 2023/0146336 | A1 | 5/2023 | Wang et al. | |
| 2023/0334070 | A1 | 10/2023 | Gullapudi et al. | |

OTHER PUBLICATIONS

Office Action in European Appln. No. 23161938.8, mailed on Jul. 23, 2025, 8 pages.
U.S. Appl. No. 17/452,441, filed Oct. 27, 2021, Arumugam et al.
U.S. Appl. No. 17/455,046, filed Nov. 16, 2021, Gullapudi.
U.S. Appl. No. 17/646,886, filed Jan. 4, 2022, Gullapudi et al.
U.S. Appl. No. 17/646,889, filed Jan. 4, 2022, Gullapudi et al.
U.S. Appl. No. 17/647,477, filed Jan. 10, 2022, Nguyen et al.
Christophides et al., "End-to-End Entity Resolution for Big Data: A Survey" ACM Computing Surveys (CSUR), vol. 53, Issue 6, 2020, 54 pages.
Devlin et al., "Bert: Pre-training of deep bidirectional transformers for language understanding." CoRR, Submitted on May 2019, arXiv:1810.04805v2, 16 pages.
Extended European Search Report in European Appln. No. 23161938.8, mailed on Aug. 16, 2023, 9 pages.
Final Office Action in U.S. Appl. No. 17/723,586, mailed on Feb. 1, 2024, 26 pages.
Non-Final Office Action in U.S. Appl. No. 17/723,586, mailed on Aug. 8, 2023, 22 pages.
Non-Final Office Action in U.S. Appl. No. 17/723,586, mailed on Jul. 15, 2024, 23 pages.
Office Action in Chinese Appln. No. 202310391055.9, mailed on Dec. 27, 2025, 20 pages (with English translation).

* cited by examiner

300

| Bank Statement ID | Company Code | Amount | Currency | Partner Name | Note |
|---|---|---|---|---|---|
| 1000 | CC1 | 990 | EUR | ACME | 1000789 |
| 2000 | CC2 | 2000 | USD | | 90011 876, 895 REF Soylent |
| ⋮ | ⋮ | ⋮ | ⋮ | ⋮ | ⋮ |

302

?

| Document # | Company Code | Amount | Currency | Organization |
|---|---|---|---|---|
| 10000789 | CC1 | 1000 | EUR | ACME |
| 90011876 | CC2 | 1200 | USD | Soylent |
| 90011898 | CC2 | 800 | USD | Soylent |
| 10000790 | CC1 | 1100 | EUR | ACME |
| ⋮ | ⋮ | ⋮ | ⋮ | ⋮ |

ENTITY LINKING AND FILTERING USING EFFICIENT SEARCH TREE AND MACHINE LEARNING REPRESENTATIONS

CLAIM OF PRIORITY

This application claims priority under 35 USC § 120 to U.S. patent application Ser. No. 17/723,586, filed on Apr. 19, 2022, the entire contents of which are hereby incorporated by reference.

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

SUMMARY

Implementations of the present disclosure are directed to a machine learning (ML) system for matching a query item to one or more target items. More particularly, implementations of the present disclosure are directed to a ML system that reduces a number of target items from consideration as potential matches to a query item using token embeddings and a search tree.

In some implementations, actions include receiving query item text associated with a query item that is to be matched to one or more target items of a superset of target items, the query item text including one or more query item tokens, for a first query item token of the query item text: determining, by a first ML model, a first query item token embedding, comparing the first query item token embedding to target item token embeddings of target items tokens included within a search space to identify at least one target item token that is sufficiently similar to the first query item token, and associating the first query item token with a revised search space within a tracker, determining a set of matched item tokens based on the tracker, the set of matched item tokens indicating one of a match and a partial match between a query item token and a target item token, defining a set of target items from the set of matched item tokens, a number of target items in the set of target items being less than a number of target items in the superset of target items, and providing inference results by processing the query item and target items of the set of target items through a second ML model, the inference results indicating a match between the query item and at least one target item in the set of target items. Other implementations of this aspect include corresponding systems, apparatus, and computer programs, configured to perform the actions of the methods, encoded on computer storage devices.

These and other implementations can each optionally include one or more of the following features: the search space is defined within a search tree that includes a set of nodes, each node representative of a respective target item token in a set of target item tokens; the revised search space includes a search sub-space of the search space; the search space is provided in a queue of search spaces, a length of the queue being defined by a window parameter; actions further include, for a second query item token of the query item text, determining, by the first ML model, a second query item token embedding, and comparing the second query item token embedding to target item token embeddings of target items tokens included within the revised search space; actions further include determining that no target item tokens represented in the revised search space is sufficiently similar to the second query item token, and in response, comparing the second query item token embedding to target item token embeddings of target items tokens included within an alternative search space present in the queue; and, during a training phase, the first ML model is fine-tuned based on sets of perturbations, each set of perturbations corresponding to an item token.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
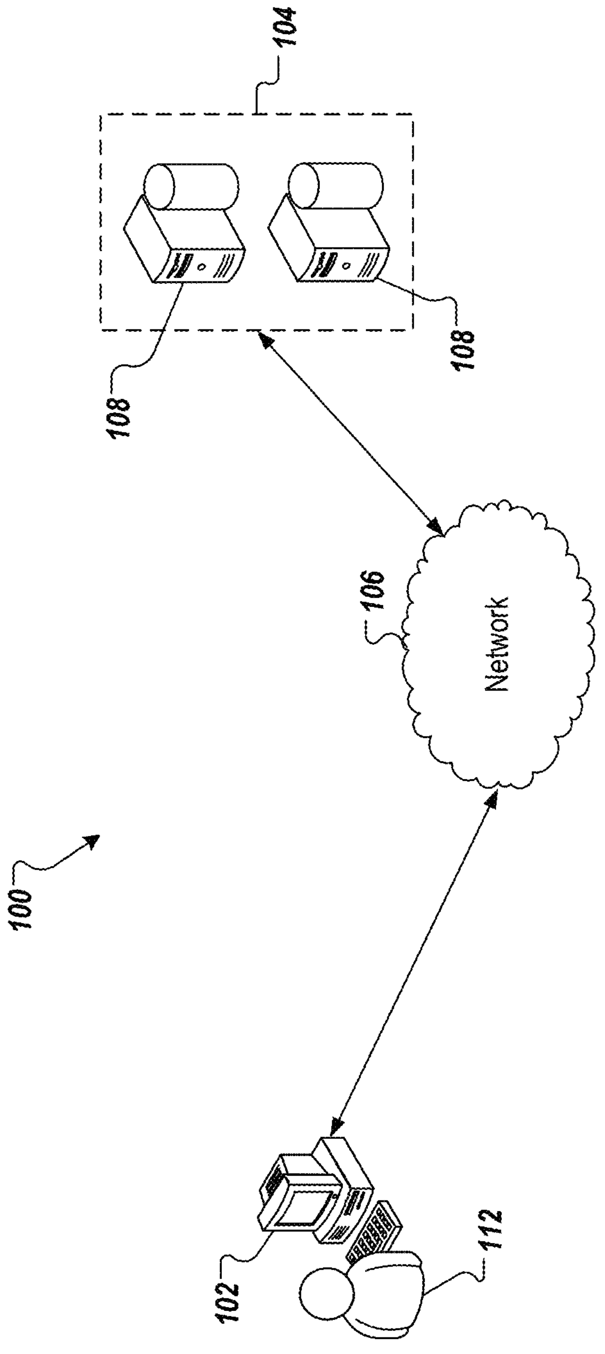
FIG. 1 depicts an example architecture that can be used to execute implementations of the present disclosure.

Implementations of the present disclosure are directed to a machine learning (ML) system for matching a query item to one or more target items. More particularly, implementations of the present disclosure are directed to a ML system that reduces a number of target items from consideration as potential matches to a query item using token embeddings and a search tree.

Implementations can include actions of receiving query item text associated with a query item that is to be matched to one or more target items of a superset of target items, the query item text including one or more query item tokens, for a first query item token of the query item text: determining, by a first ML model, a first query item token embedding, comparing the first query item token embedding to target item token embeddings of target items tokens included within a search space to identify at least one target item token that is sufficiently similar to the first query item token, and associating the first query item token with a revised search space within a tracker, determining a set of matched item tokens based on the tracker, the set of matched item tokens indicating one of a match and a partial match between a query item token and a target item token, defining a set of target items from the set of matched item tokens, a number of target items in the set of target items being less than a number of target items in the superset of target items, and providing inference results by processing the query item and target items of the set of target items through a second ML model, the inference results indicating a match between the query item and at least one target item in the set of target items.

Implementations of the present disclosure are described in further detail with reference to an example problem space that includes the domain of finance and matching bank statements to invoices. More particularly, implementations of the present disclosure are described with reference to the problem of, given a bank statement (e.g., a computer-readable electronic document recording data representative of a bank statement), enabling an autonomous system using a ML model to determine one or more invoices (e.g., computer-readable electronic documents recording data representative of one or more invoices) that are represented in the bank statement. It is contemplated, however, that implementations of the present disclosure can be realized in any appropriate problem space.

Implementations of the present disclosure are also described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP Leonardo Machine Learning) to learn accounting activities and to capture rich detail of customer and country-specific behavior. An example accounting activity can include matching payments indicated in a bank statement to invoices for clearing of the invoices. For example, using an enterprise platform (e.g., SAP S/4 HANA), incoming payment information (e.g., recorded in computer-readable bank statements) and open invoice information are passed to a matching engine, and, during inference, one or more ML models predict matches between records of a bank statement and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an autonomous system that uses a ML model to match entities. That is, the server system 104 can receive computer-readable electronic documents (e.g., bank statement, invoice table), and can match entities within the electronic document (e.g., a bank statement) to one or more entities in another electronic document (e.g., invoice table). In some examples, the server system 104 includes a ML platform that provides and trains a ML model, as described herein.

Figure 2:
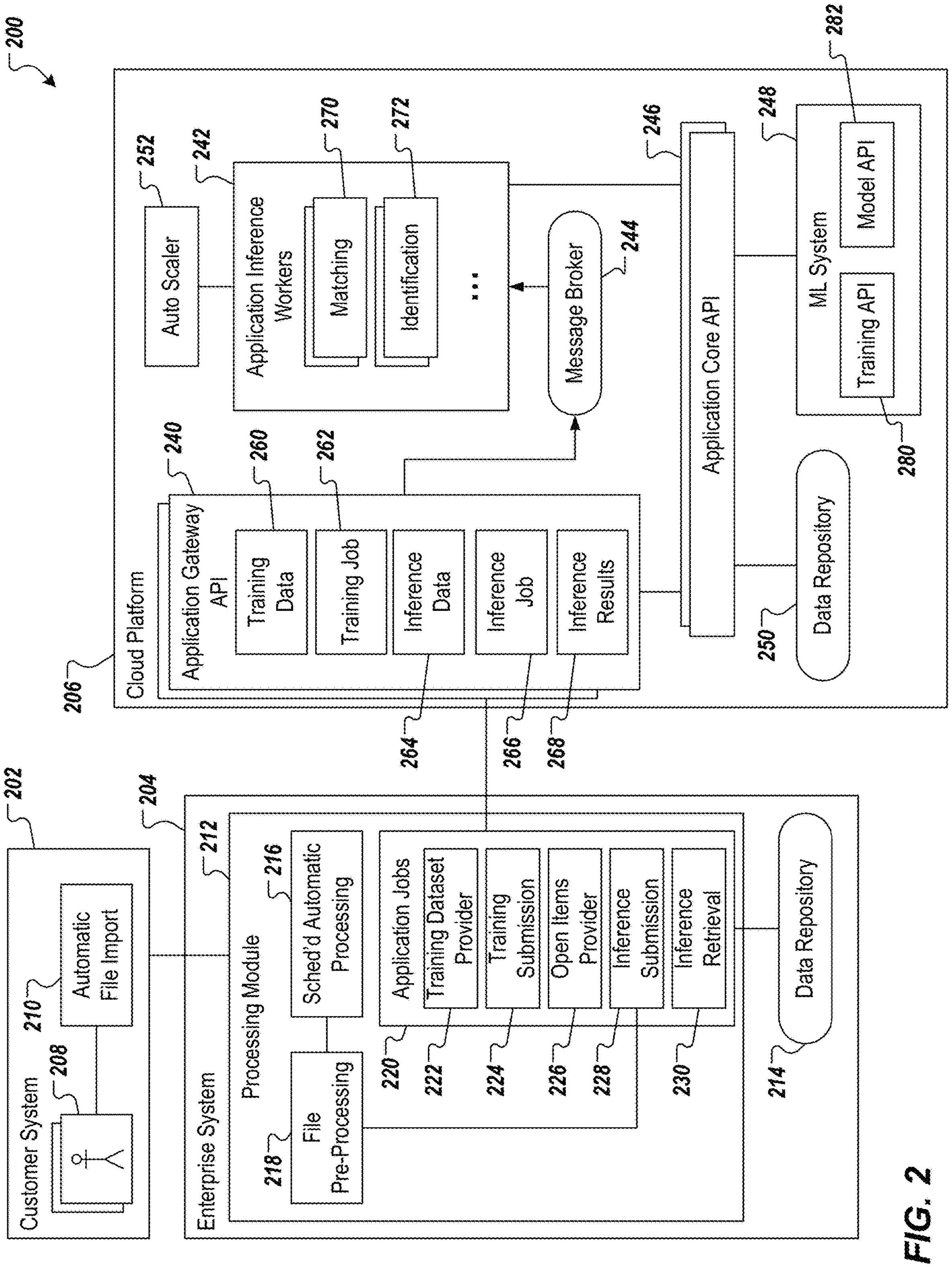
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a customer system 202, an enterprise platform 204 (e.g., SAP S/4 HANA) and a cloud platform 206 (e.g., SAP Cloud Platform (Cloud Foundry)). As described in further detail herein, the enterprise platform 204 and the cloud platform 206 facilitate one or more ML applications that leverage ML models to provide functionality for one or more enterprises. In some examples, each enterprise interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise platform 204 for processing by a ML application. For example, and in the context of CashApp, an invoice data file and a bank statement data file can be imported to the enterprise platform 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise platform 204 includes a processing module 212 and a data repository 214. In the context of CashApp, the processing module 212 can include a finance—accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction, also referred to herein as an inference result. In the context of CashApp, the training data can include invoice to bank statement matches as examples provided by a customer, which training data is used to train a ML model to predict invoice to bank statement matches. Also in the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264 (e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 262. In response, the application gateway API 240 sends a training request to the ML system 248 through the application core API 246. By way of non-limiting example, the ML system 248 can be provided as SAP Leonardo Machine Learning. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 266. In some examples, the auto-scaler 252 functions to scale the inference workers up/down depending on the number of inference jobs submitted to the cloud platform 206.

To provide further context for implementations of the present disclosure, and as introduced above, the problem of matching entities represented by computer-readable records (electronic documents) appears in many contexts. Example contexts can include matching product catalogs, deduplicating a materials database, and matching incoming payments from a bank statement table to open invoices, the example context introduced above.

Figure 3:
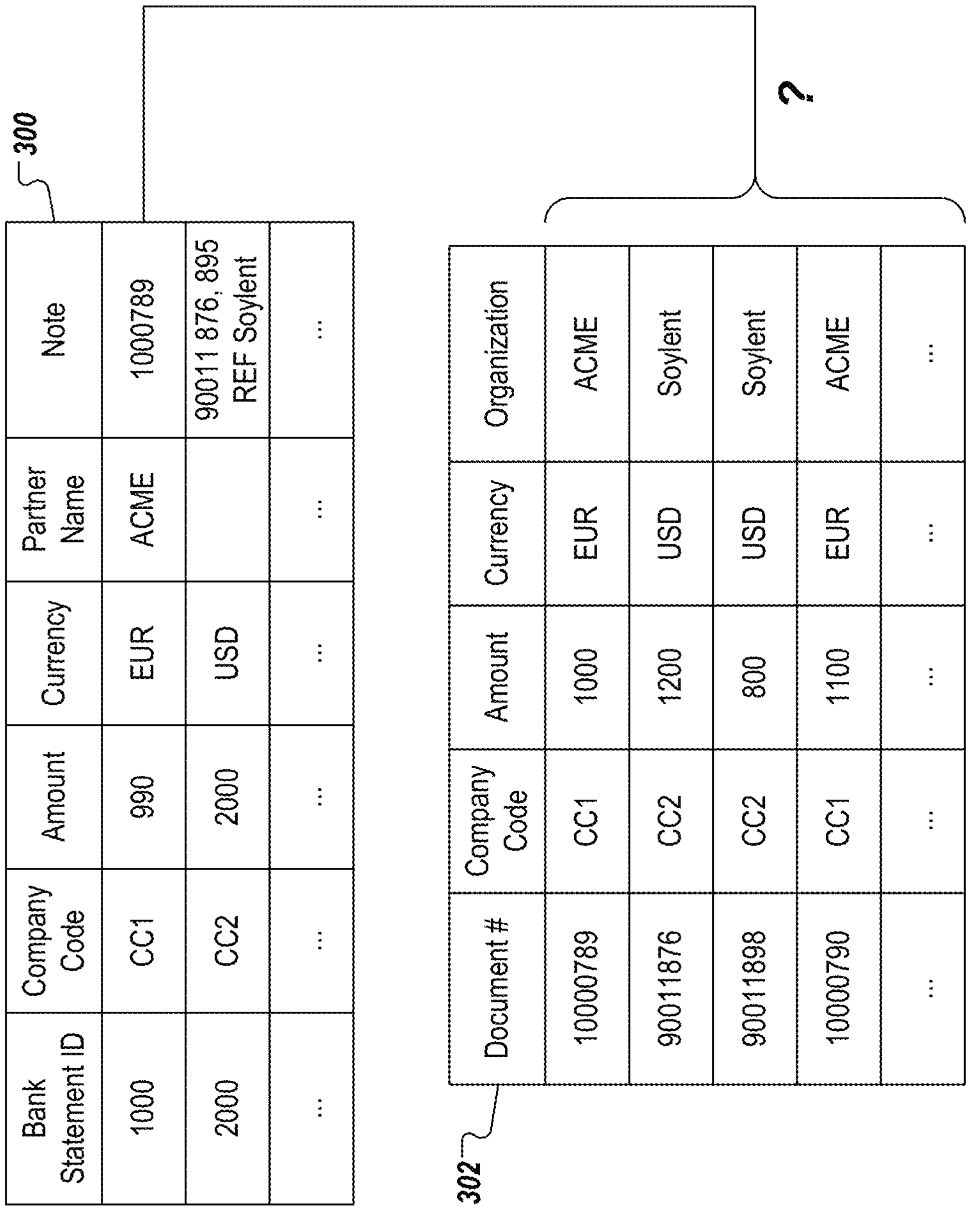
FIG. 3 depicts portions of example electronic documents.

In the example context, FIG. 3 depicts portions of example electronic documents. In the example of FIG. 3, a first electronic document 300 includes a bank statement table that includes records representing payments received, and a second electronic document 302 includes an invoice table that includes invoice records respectively representing invoices that had been issued. In the example context, each bank statement record is to be matched to one or more invoice records. Accordingly, the first electronic document 300 and the second electronic document 302 are processed using one or more ML models that provide predictions regarding matches between a bank statement record (entity)

and one or more invoice records (entity/-ies) (e.g., using CashApp, as described above).

To achieve this, a ML model (matching model) is provided as a classifier that is trained to predict item pairs to a fixed set of class labels ($\vec{l}$) (e.g., $l_0$, $l_1$, $l_2$). For example, the set of class labels ($\vec{l}$) can include 'no match' ($l_0$), 'single match' ($l_1$), and 'multi match' ($l_2$). In some examples, the ML model is provided as a function $f$ that maps a query item ($\vec{a}$) and a target item ($\vec{b}$) into a vector of probabilities ($\vec{p}$) (also called 'confidences' in the deep learning context) for the labels in the set of class labels. This can be represented as:

$$f(\vec{a}, \vec{b}) = \begin{pmatrix} p_0 \\ p_1 \\ p_2 \end{pmatrix}$$

where $\vec{p}=\{p_0, p_1, p_2\}$. In some examples, $p_0$ is a prediction probability (also referred to herein as confidence c) of the item pair $\vec{a}$, $\vec{b}$ belonging to a first class (e.g., no match), $p_1$ is a prediction probability of the item pair $\vec{a}$, $\vec{b}$ belonging to a second class (e.g., single match), and $p_2$ is a prediction probability of the item pair $\vec{a}$, $\vec{b}$ belonging to a third class (e.g., multi match).

Here, $p_0$, $p_1$, and $p_2$ can be provided as numerical values indicating a likelihood (confidence) that the item pair $\vec{a}$, $\vec{b}$ belongs to a respective class. In some examples, the ML model can assign a class to the item pair $\vec{a}$, $\vec{b}$ based on the values of $p_0$, $p_1$, and $p_2$. In some examples, the ML model can assign the class corresponding to the highest value of $p_0$, $p_1$, and $p_2$. For example, for an entity pair $\vec{a}$, $\vec{b}$, the ML model can provide that $p_0$=0.13, $p_1$=0.98, and $p_2$=0.07. Consequently, the ML model can assign the class 'single match' (11) to the item pair $\vec{a}$, $\vec{b}$.

However, during inference, each item (record) from the query table is compared to all of the items in the target table to get the probabilities of matches between the respective item pairs. As the search space in the target items is can be relatively large (e.g., hundreds of invoices) this results in a significant consumption of resources (e.g., processors, memories) to generate all of the probabilities, as well as increasing the time required to conduct inference.

In view of the above context, implementations of the present disclosure are directed to decreasing resource consumption in matching of items using one or more ML models. More particularly, implementations of the present disclosure are directed to reducing a search space of target items that are to be matched with a query item to enable resource- and time-efficient matching of query items with target items. Implementations of the present disclosure provide time- and resource-efficiencies in executing inference (i.e., matching items).

As described in further detail herein, implementations of the present disclosure leverage information provided in the query items and target items. For example, and in the example context, each bank statement item has a text field (e.g., memoline) that can contain useful information about invoices that could be a match (e.g., entity name, contract account number, etc.). Implementations of the present disclosure, improve the matching process by efficiently filtering target items (e.g., invoices) based on the information (e.g., memoline information) from attempted match with certain query items. This reduces the number of combinations of query items to target items that are processed in pair-wise matching. As described in further detail herein, implementations of the present disclosure use provide a search tree by extending a Trie data structure that stores words (or string tokens) instead of characters at each node. Combined with deep learning (DL)-based representations of entities filtering of target items is enabled.

As described in further detail herein, implementations of the present disclosure address several technical challenges. For example, implementations of the present disclosure reduce search time complexity as the number of target items handled are relatively large (e.g., in the order of several millions). As another example, implementations of the present disclosure support approximate (fuzzy-matching) of string elements/tokens across query and target items (e.g., missing characters, typological errors, match partial suffixes). As another example, implementations of the present disclosure support multi-word with partial or out of order sub-words matching. As still another example, implementations of the present disclosure enable extraction of matching items that can be used for explain-ability (e.g., human-understandable explanation as to why the ML model made a particular match).

In further detail, the search tree (which can also be referred to as an index herein) is provided as a Trie data structure. A Trie data structure can be described as a sorted tree-based data-structure that stores the set of strings (the word "Trie" being an excerpt from the word "retrieval"). In some examples, the ML model is used to learn representations (embeddings provided as multi-dimensional vectors) of the query items and the target items to identify similarities there between, if any. In some examples, the Trie data structure is based on strings (e.g., words represented as string tokens) and is used for matching and reducing the similarity search space.

With regard to the ML model (embedding model), a query string token (i.e., a word of a query item) can be compared to target string tokens (i.e., words of target items) to identify similar tokens. In the present disclosure, words are used as the tokens for easier interpretation. However, it is noted that implementations of the present disclosure are not limited only to the word level tokenization and appropriate variation of tokenization can be used. Continuing, a query word embedding generated by the ML model can be compared to target word embeddings to identify words in target items that are determined to be sufficiently similar to the word of the query item. In some examples, if a similarity score meets or exceeds a threshold similarity score, a word of the target item is determined to be sufficiently similar to the word of the query item. A set of similar target item words can be defined, each target item word in the set of similar target items having been determined to be sufficiently similar to the query item word based on embedding comparison. In some examples, the similarity score between the query item word and a target item word can be determined as a metric distance between the respective embeddings (e.g., cosine distance, L2 norm).

In further detail, target string token embeddings of respective target item words are generated by the ML model (embedding model) after the ML model is trained. For example, for each target item, a target item word (string token) is processed through the ML model to provide a target string token embedding. In this manner, a set of target string token embeddings is provided, where each target string token embedding is provided as a multi-dimensional vector representative of a respective target string token. At inference time, a query word (string token) of a query item, is processed through the ML model to provide a query string token embedding. The query string token embedding is provided as a multi-dimensional vector representative of the query string token. The query string token embedding is used to identify closest (sufficiently similar) target string token embeddings (and thus, target item words) whose embeddings are already precomputed after the initial training of the ML model.

In some implementations, the ML model used to provide the embeddings (embedding model) is provided as a transformer model. An example transformer model includes, but is not limited to, the Bidirectional Encoder Representations from Transformers (BERT) model, referred to herein as BERT. Transfer learning on the BERT model is utilized with fine tuning on the query item data (query string tokens) and the target item data (target sting tokens). More particularly, for each string token in the query item or the target item, whichever is being considered, similar words are obtained by replacing random characters in the original string to emulate typological errors.

In some examples, character replacement is done using a key or character map that contains the nearby character for a specific character in the keyboard to capture typical human typing errors. In some examples, one or more characters are removed from the string tokens to represent accidental deletion. For example, random prefix characters from the word are removed to represent typical real-world data where only suffix characters are specified for certain fields (e.g., bank account numbers, insurance numbers, B2B and/or B2C transactional data). In some examples, for each string token (word), k perturbed samples are generated. In some examples, k is determined based on a length l of the string token being considered (e.g., k=¼l). In this manner, the number of perturbations (k) for a word (string token) depends on the length (l) of the respective word. In some examples, the k perturbations individually, which means that k examples are generated as typographical errors and k examples are generated with prefix/suffix deletions. In this manner, additional data is generated which will help in the model training.

Table 5, below, provides example string tokens and respective example perturbations for each:

TABLE 5

| Example Perturbations | |
|---|---|
| Input | Output |
| Sundeep | Sandeep |
| Sundeep | Sandep |
| Sundeep | Sundee |
| Sandeep | Sundeep |
| Sandeep | Sundep |
| Sandeep | Sandee |
| . . . | . . . |

In some implementations, the perturbations are used to fine tune the ML model (embedding model) to learn representations of matching string token pairs. One of the string tokens in the pair being the original string token in the query or target and the other being the perturbated string token with typological errors represented in the perturbations. As described in further detail herein, the so-trained and tuned ML model (embedding model) is used to identify similar string tokens (words) within the target item dataset given a query word, even if the query word contains some missing characters, wrong characters, and/or missing prefixes of characters Referring again to the search tree, the search tree is provided as a word Trie and can be described as a search tree data structure that is used for locating specific keys from within a set to identify tokens having common prefixes. These keys can be strings with links between nodes defined by individual words (not by the entire key). In some examples, to access a key (to recover its value, change it, or remove it), the search tree is traversed depth-first. As described in further detail herein, the search tree is built with the words (string tokens) of a data set (e.g., list of entities potentially represented within the target items) rather than individual characters.

Figure 4:
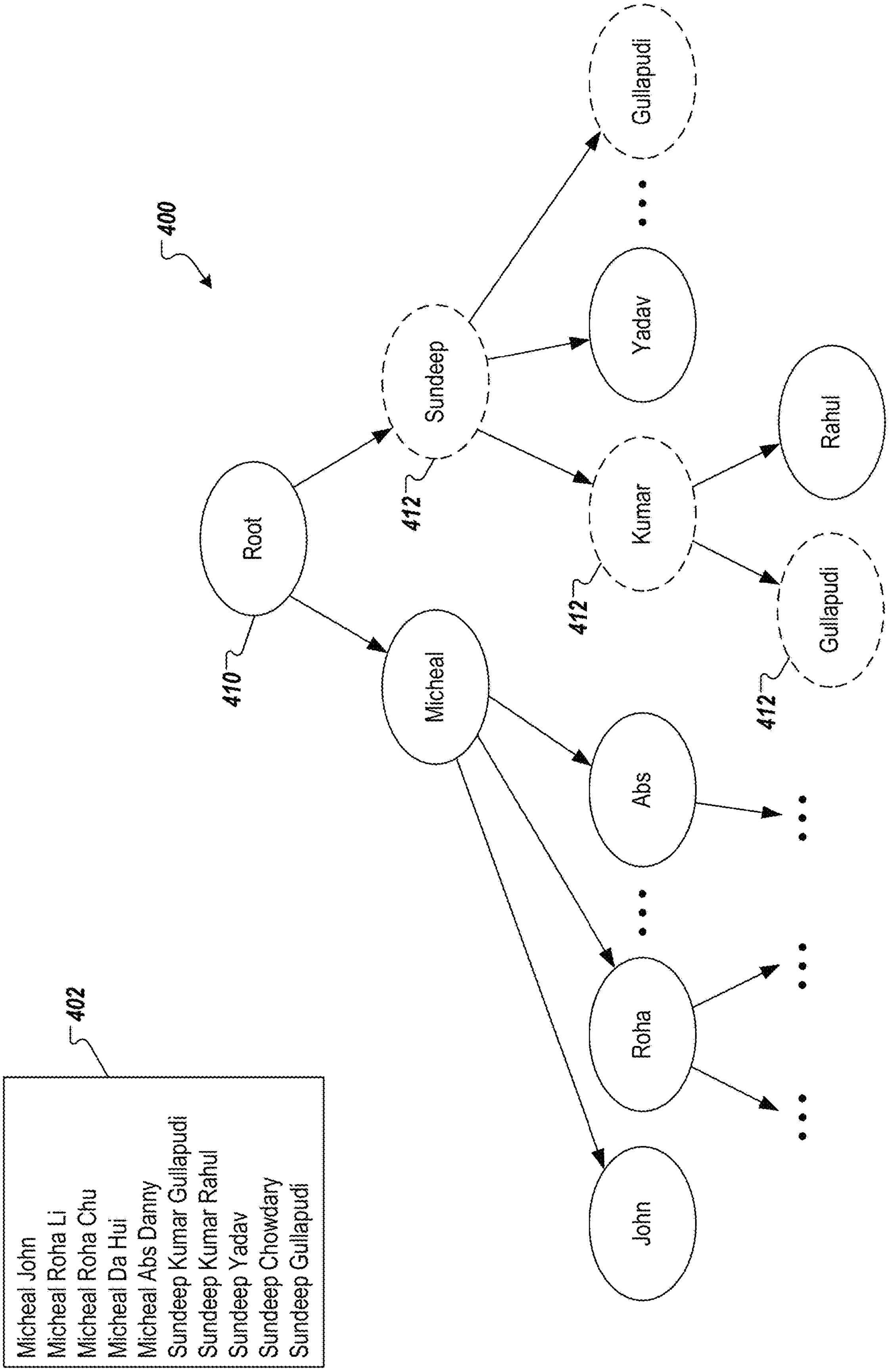
FIG. 4 depicts an example search tree in accordance with implementations of the present disclosure.

FIG. 4 depicts an example search tree 400 in accordance with implementations of the present disclosure. The example search tree 400 of FIG. 4 is provided based on a data set 402. In the example of FIG. 4, the data set 402 includes a list of names. In some examples, the data set 402 includes string tokens that are expected to be included in query items and/or target items. For example, and the example context of matching banks statements to invoice, the data set 402 can include names of enterprises and/or persons (referred to herein as entities) that do business together (e.g., payee names, payor names). As depicted in FIG. 4, the search tree includes a root node 410 and child nodes 412. Each child node represents a string token in the data set 402. For example, a first level child node 412 represents a first string token, a second level child node 412 represents a second string token that follows the first string token, and a third level child node 412 represents a third string token that follows the second string token.

Accordingly, in the example context of matching bank statements to invoices, a data set can represent a list of customers (entities) that are to be invoiced and payment is expected from. In some examples, such a data set can have a significant number of entities (e.g., 10 million entities (class labels)) that can include a relatively large number of similar string tokens (e.g., 400,000 unique words in the 10 million entities). Instead of searching through the entire data set, implementations of the present disclosure significantly minimize the search space through use of the unique words and the relationship between the unique words, as represented in the search tree. As described in further detail herein, the ML model (embedding model) is used to identify similar string tokens and the string tokens are searched in the search space to find the related search space for the next string tokens.

In further detail, a set of hyperparameters is provided and includes w—a window size for the search space, n—indicating a top n similar matches above a minimum threshold, and c—the minimum threshold. For a query item (an item that is to be matched to one or more target items using a ML model (matching model)), all of the unique tokens in text of the query item are determined (e.g., in the example context, all unique tokens in the memoline of the query item are determined). A queue is initialized by the window size w, which enables mapping of tokens to one another within a distance, as represented by the window size. The queue is initialized to hold search spaces and has several slots equal to the window size. For example, if the window size is 3, the queue has 3 slots, in which to store search spaces. Initially, the queue is populated with a search space that encompasses the entirety of the search tree. That is, a search space $C_T$ is initially included in the queue (i.e., before any searching is conducted) and includes all nodes of the search tree (i.e., the total corpus of words in the search tree).

A first example can be considered based on an example window size of 3 (w=3) and example query item text of:

Gullapudi 123ABC Sundeep has paid 100$

The example inference text can be retrieved because the distance between the tokens "Gullapudi" and "Sundeep" is 1 (i.e, is less than or equal to the window size of 3). That is, Gullapudi is mapped to Sundeep as a match. A second example can be considered with an example query item text of:

Gullapudi 123ABC has paid 100$ Sundeep

In this example, the token "Gullapudi" and the token "Sundeep" are separated by 4 tokens, which is greater than the window size of 3. Consequently, Gullapudi is mapped to Sundeep as a partial match.

Continuing, a tracker is initialized with the same length of inference text processing. For example, in the above example an array data structure is used as the tracker for inference text (e.g., "Gullapudi 123ABC Sundeep has paid 100$"). In this example, there are 6 tokens. Consequently, the tracker is initialized with an array of 6 null objects—[Null, Null, Null, Null, Null, Null]. These null objects are replaced with the search space indexes where the token is found. This enables identification of the relation between the tokens which are apart by few tokens but within the range of window size. In some examples, the tracker retains information about each of the words and stores the information of the search space (index) a respective word is found in. That is, for each word of the query item, the tracker indicates a search space within the search tree that the word is located within. To illustrate this, the following example query item text can be considered:

Gullapudi 123ABC Sundeep has paid 100$

Here, the example query item text includes 10 words (string tokens). Consequently, the following example tracker of Table 6 can be provided:

TABLE 6

Example Tracker

| Word | S |
|---|---|
| Gullapudi | |
| 123ABC | |
| Sundeep | |
| . . . | . . . |
| 100$ | |

In some implementations, tokens of the inference text are iterated over. That is, for each query item word (string token) in the inference text (e.g., memoline), a series of operations is executed. In some examples, a search space is retrieved from the queue. Within the search space, similar tokens, if any, are determined using the embeddings similarity via ML model (embedding model). That is, and as discussed herein, a query string token embedding of the query item word (string token) is determined using the ML model and is compared to target string token embeddings of target item words in the search tree to identify any similar tokens. More particularly, and as described in detail herein, the query string token embedding is compared to target string token embeddings (pre-computed) to identify any target item words that are determined to be sufficiently similar to the query item word based on the minimum threshold (c, threshold similarity score). For the top n similar words that are identified within the search tree, the nodes of the token(s) and adjacent nodes (e.g., descendant nodes) are used to define a search space that is added to the queue.

For purposes of non-limiting illustration, the above example query item text and the search tree of FIG. 4 are referenced. For example, at the start, the queue (Q) is populated with the search space $C_T$, which includes all nodes of the search tree 400. For example:

Q:[$C_T$]

The query item word "Gullapudi" is considered first and a query string token embedding is generated by the ML model (embedding model). The query string token embedding is compared to target string token embeddings of all target words represented within the search space $C_T$ and similar words are identified, if any. In the example of FIG. 4, the query item word "Gullapudi" is matched to the target item word "Gullapudi" in the descendant nodes under the node representing the target item word "Sundeep." Consequently, a search space $C_0$ can be defined to include the node representing the target item word "Sundeep" and its descendant nodes corresponding to the target item word "Gullapudi" (All the adjacent nodes to matched node, can be parent nodes or child nodes). In the example of FIG. 4, the search space $C_0$ is represented by the nodes indicated in dashed line. In this sense, the search space $C_0$ can be referred to as a revised search space relative to the search space $C_T$. In this example, the search space $C_0$ is a search sub-space of the search space $C_T$.

Continuing with the example above, the tracker is updated to associate the query item word "Gullapudi" with the search space $C_0$. For example, in Table 6, above, $C_0$ is recorded in the cell adjacent to "Gullapudi." Also, the queue is updated to include the search space $C_0$. For example:

Q:[$C_0$, $C_T$]

Continuing with the example above, the query item word "123 ABC" is next considered and a query string token embedding is generated by the ML model (embedding model). The query string token embedding is compared to target string token embeddings of all target words represented within the search space $C_0$ (the first search space in the queue) and similar words are identified. In the example of FIG. 4, there are no target item words that are similar to the query item word "123ABC." In response, it is determined whether the queue includes another search space besides the search space $C_0$ and the search space $C_T$. In this example, there are no other search spaces. Consequently, a remainder search space $C_R$, which includes all nodes of the search space $C_T$ that are not representative of a query item word that has already been searched in the search space $C_0$.

In some examples, if a word is not matched with all the search spaces in the queue, it would be searched against the entire search space to check if there are any matches possible. Each space in the queue are subsets of entire search space. For optimizing, already searched areas are removed. The following example can be considered, in which characters are provided in the search space. Queue=[C2, C1, C0]=>$C_2$={A, B, C}, $C_1$={D, E, F} $C_0$={G, H}, $C_T$={A, B, C, D, E, F, G, H, I, J, K, L}, is provided. In this example, $C_2$, $C_1$, $C_0$ have been searched and it is determined that words are not matching, so the entire corpus $C_T$ is searched. However, part of the corpus is already searched, so for optimizing the search is only conducted in the remaining items (e.g., {I, J, K, L}). The query string token embedding is compared to target string token embeddings of all target words represented within the remainder search space $C_R$ and similar words are identified, if any. In the example of FIG. 4, there are no target item words that are similar to the query item word "123ABC." Consequently, the tracker is updated to indicate that the query item word “123ABC” is not associated with a search space.

Continuing with the example above, the query item word “Sundeep” is next considered and a query string token embedding is generated by the ML model (embedding model). The query string token embedding is compared to target string token embeddings of all target words represented within the search space $C_0$ (the first search space in the queue) and similar words are identified. In the example of FIG. 4, the query item word “Sundeep” is matched to the target item word “Sundeep” in the node representing the target item word “Sundeep.” Consequently, a search space $C_1$ can be defined to include the node representing the target item word “Sundeep” and its descendant nodes included in the search space $C_0$. In the example of FIG. 4, the search space $C_1$ is identical to the search space $C_0$, as represented by the nodes indicated in dashed line. The tracker is updated to associate the query item word “Sundeep” with the search space $C_1$. For example, in Table 6, above, $C_1$ is recorded in the cell adjacent to “Sundeep.” Also, the queue is updated to include the search space $C_1$. For example:

Q:[$C_1$, $C_0$, $C_T$]

The above-described operations are executed for the remaining query item words in the query item text. In this example, none of the other query items words have similar target items words in the search tree 400 of FIG. 4. Consequently, the tracker is updated to indicate that the query item words “has,” “paid,” and “100$” are each not associated with a search space.

In accordance with implementations of the present disclosure, because the query item words “Gullapudi” and “Sundeep” are within 3 words of one another (e.g., w=3), the query item words are determined to be associated with one another. That is, the query item words “Gullapudi” and “Sundeep” are determined to be a match.

In some examples, query item words can be determined to be a partial match. By way of non-limiting example, the following example query item text can be considered:

Gullapudi 123ABC has paid 100$ Sundeep

In this example, the query item word “Gullapudi” and the query item word “Sundeep” are separated by 4 words, which is greater than the window size of 3. Consequently, “Gullapudi” and “Sundeep” is considered as a partial match which means those tokens are not a complete entity.

In accordance with implementations of the present disclosure, the matches and partial matches are used to filter target items that are to be compared to the query item by the ML model (matching model). For example, a superset of target items is provided and includes all of the target items that could be matched to a query item. Matches can be directly used for the target set but in case of partial matches, all of the possible entities that has the partial match token would be incorporated into the target set. The resultant set contains only the entities that are an exact match or supersets of partial matches. This target set would be much less than the original target dataset. In this manner, the number of matches that the ML model (matching model) has to process is significantly reduced, which provides time- and resource-efficiencies. In some examples, a distinction is made between matches and partial matches for explainability and debugging purposes, while filtering is conducted on both matches and partial matches.

Figure 5:
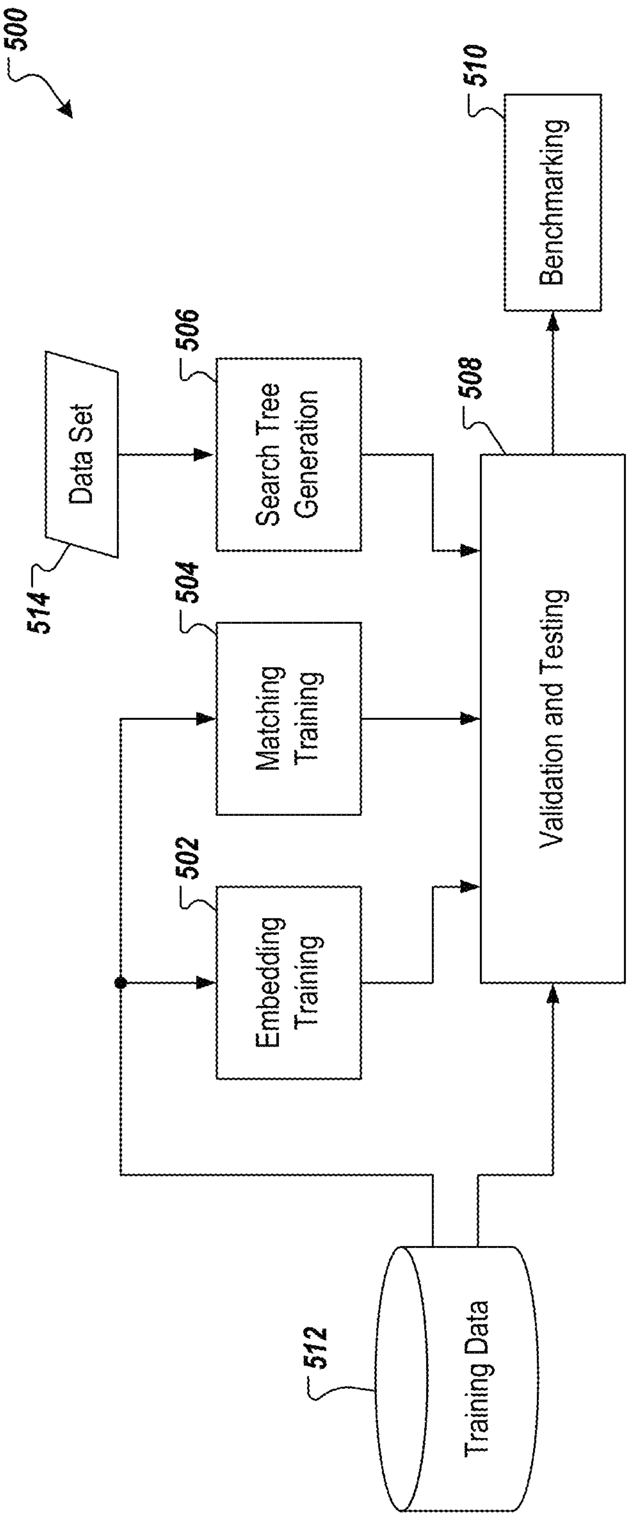
FIG. 5 depicts an example conceptual architecture for training in accordance with implementations of the present disclosure.

FIG. 5 depicts an example conceptual architecture 500 for training in accordance with implementations of the present disclosure. In the example of FIG. 5, the conceptual architecture 500 includes an embedding training module 502, a matching training module 504, a search tree generation module 506, a validation and testing module 508, and a benchmarking module 510. As described herein, a ML model that generates item word embeddings (embedding model) is trained by the embedding training module 502 using training data representative of item words. As also described herein, the ML model (embedding model) and can be fine-tuned based on a set of perturbations provided for one or more items words. The ML model is training using a portion of training data 512 (e.g., unique item words associated with items). As also described herein, a ML model that predicts matches between items is trained using a portion of the training data 512 (e.g., query items, target items). For example, a sub-set of the training data (training sub-set) is used by the matching training module 504 to train the ML model. After training, the validation and testing module 508 validates and tests the ML models using respective portions of the training data 512 and a search tree generated by the search tree generation module 506. For example, a sub-set of the training data (validation sub-set) is used to validate a respective ML model and a sub-set of the training data (testing sub-set) is used to test the respective ML model.

In accordance with implementations of the present disclosure, the search generation module 504 generates a search tree based on a data set 514. In some examples, the data set 514 includes entities that could be represented within query items and/or target items. In the example context of matching banks statements to invoices, the data set 514 can include names of enterprises and/or persons (referred to herein as entities) that do business together (e.g., payee names, payor names). In some examples, for each entity nodes are provided in the search tree, each node representing a word of the entity and nodes can be linked depending on words being common to an entity. By way of non-limiting example, and with reference to FIG. 4, for the entity “Sundeep Gullapudi,” a node for “Sundeep” is added and a descendant node for “Gullapudi” is added and linked. For the entity “Sundeep Kumar Gullapudi,” it can be determined that a node for “Sundeep” already exists (e.g., from the entity “Sundeep Gullapudi”), but a descendant node for “Kumar” linked to the node for “Sundeep” does not exist. Consequently, a descendant node for “Kumar” is added. Further, and because “Gullapudi” follows “Kumar,” a descendant node is added for “Gullapudi” and is linked to the node for “Kumar.” In this manner, although “Gullapudi” is a unique word, there are multiple nodes representing “Gullapudi.” In other terms, each path through the search tree represents a unique combination of unique words. Consequently, a unique word can be represented by multiple nodes within the search tree, while a unique entity is represented along a single path within the search tree.

Figure 6:
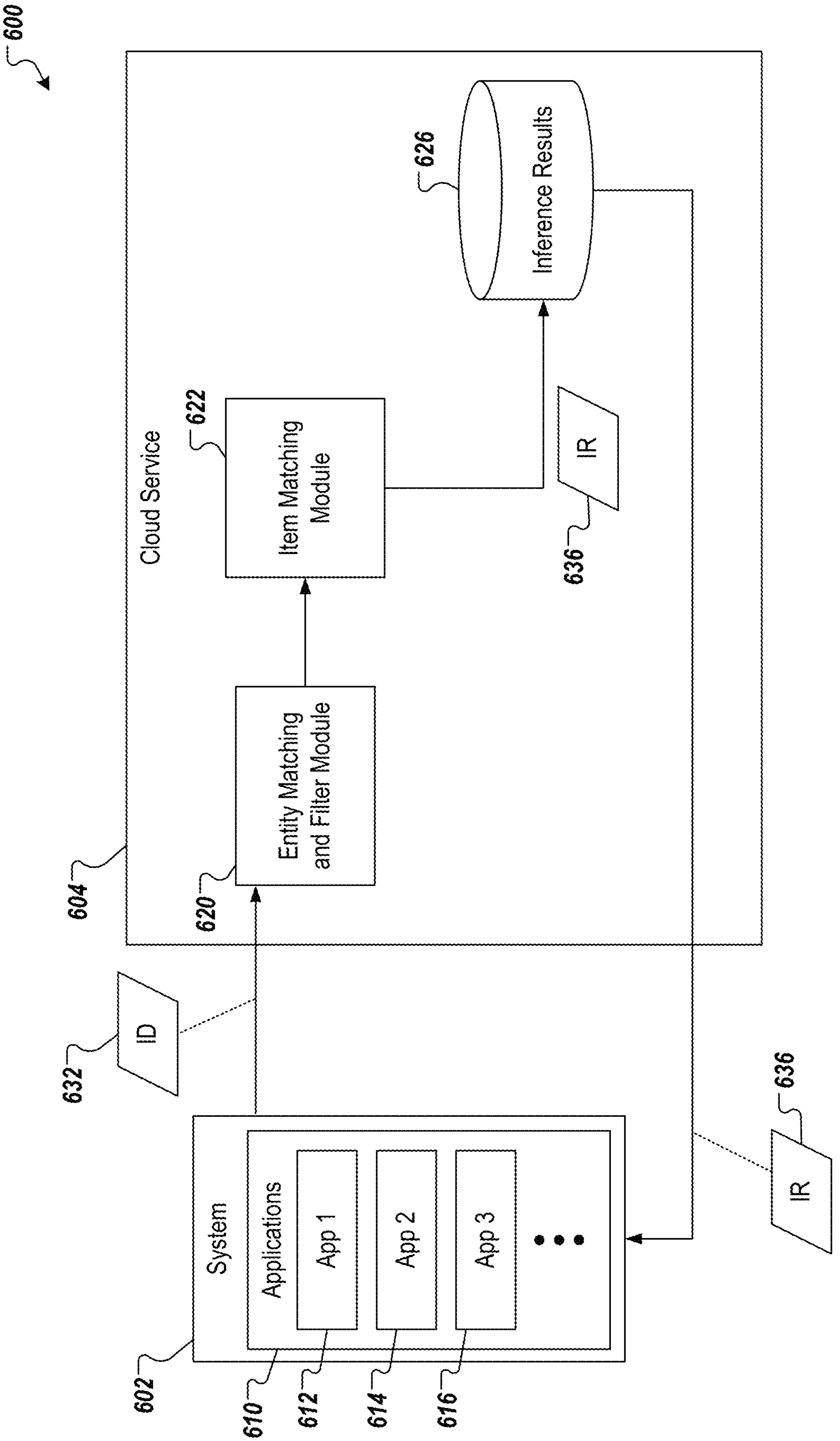
FIG. 6 depicts an example conceptual architecture for inference in accordance with implementations of the present disclosure.

FIG. 6 depicts an example conceptual architecture 600 for inference in accordance with implementations of the present disclosure. In the example of FIG. 6, the conceptual architecture 600 includes an enterprise system 602 (e.g., SAP S/4 HANA (either cloud or on premise)) and a cloud service 604. The enterprise system 602 executes a set of applications 610 including applications 612, 614, 616. In some examples, one or more of the applications 612, 614, 616 submit inference jobs to the cloud service 604 to receive inference results therefrom.

In the example of FIG. 6, the cloud service 604 is executed within a cloud platform to perform inference services. In the example of FIG. 6, the cloud service 604 includes an entity matching and filter module 620, an item matching module 622, and an inference results store 626. The entity matching and filter module 620 executes a (trained) ML model (embedding model) to provide string token embeddings, as described herein. More particularly, inference data (ID) 632 is provided and includes a set of query items and a set of target items, where each query item is to be matched to one or more target items. As described in detail herein, for each query item, the entity matching and filter module 620 defines a set of target items from a superset of target items and provides the query item and the set of target items to the item matching module 622. For example, target items in the superset of target items can be selected for inclusion in the set of target items based on matched and/or partially matched item words using the search tree, as described in detail herein. In some examples, the search tree is provided with the ID 632. The item matching module 622 processes a query item in view of a set of target items through a ML model (matching model) to predict matches (e.g., match, no match, multi-match) between the query item and one or more target items. The predicted matches are provided as inference results (IR) 636 that are stored in the inference results store 626 and provided to enterprise system 602.

Figure 7:
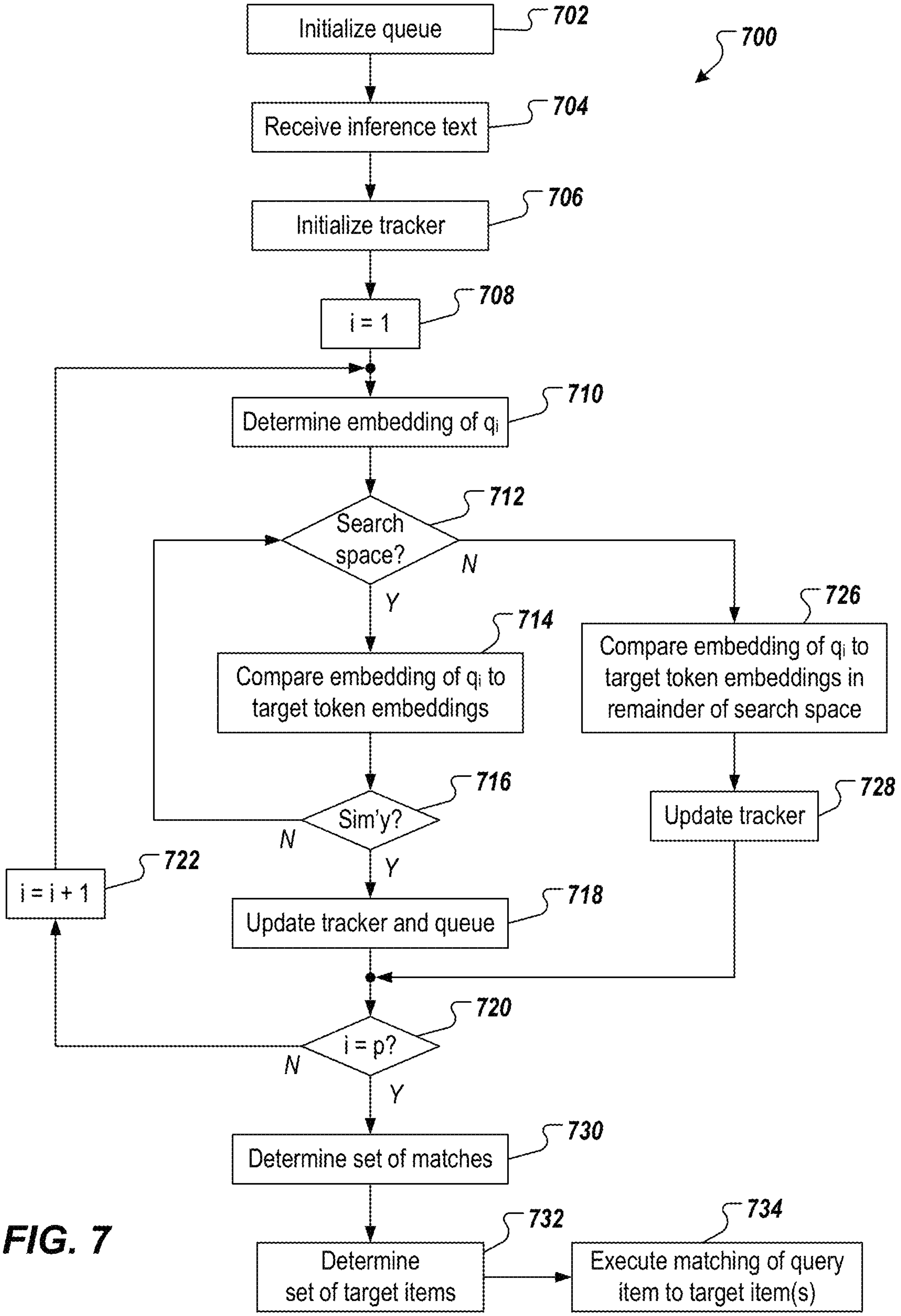
FIG. 7 depicts an example process that can be executed in accordance with implementations of the present disclosure.

FIG. 7 depicts an example process 700 that can be executed in accordance with implementations of the present disclosure. In some examples, the example process 700 is provided using one or more computer-executable programs executed by one or more computing devices.

A queue is initialized (702). For example, and as described herein, a queue is initialized by the window size w, which enables mapping of tokens to one another within a distance, as represented by the window size. The queue is initialized to hold search spaces and has several slots equal to the window size. Inference text is received (704). For example, and as described herein, inference text can include a set of tokens that are associated with an item that is to be matched. In the example context, inference text can be provided as memoline text. A tracker is initialized (706). For example, and as described herein, a tracker is initialized with the same length of inference text processing and retains information about each of the tokens and stores the information of a search space (index) a respective token is found in.

A counter i is set equal to 1 (708). A query string token embedding is determined for a query token $q_i$ (710). For example, and as described herein, a query word (string token) of a query item, is processed through the ML model to provide a query string token embedding, the query string token embedding is provided as a multi-dimensional vector representative of the query string token. It is determined whether a search space is available to search (712). If there is a search space, the query string token embedding of the token $q_i$ is compared to target token embeddings within the search space (716). For example, and as described herein, . . . .

It is determined whether the embedding of $q_i$ is similar to an embedding of a target token embedding of the search space (718). For example, and as described herein, the embedding of $q_i$ is compared to target word embeddings to identify words in target items that are determined to be sufficiently similar to the word of the query item. In some examples, if a similarity score meets or exceeds a threshold similarity score, a word of the target item is determined to be sufficiently similar to the word of the query item. A set of similar target item words can be defined, each target item word in the set of similar target items having been determined to be sufficiently similar to the query item word based on embedding comparison. In some examples, the similarity score between the query item word and a target item word can be determined as a metric distance between the respective embeddings (e.g., cosine distance, L2 norm).

If the embedding of $q_i$ is not similar to an embedding of a target token embedding of the search space, the example process 700 loops back to determine whether there are remaining search spaces to search. If the embedding of $q_i$ is similar to an embedding of a target token embedding of the search space, the tracker and queue are updated to record this (718). It is determined whether the counter i is equal to p (720). That is, it is determined whether all token of the inference text have been considered. If the counter i is not equal to p (e.g., where p is the number of tokens in the inference text), the counter i is incremented (722) and the example process 700 loops back.

If the counter i is equal to p, a set of matches is determined (730). A set of target items is determined (732). Matching of the query item to one or more target items is executed (734). For example, and as described herein, the query item and the one or more target items are processed through a ML model that matches entities to determine one or more matches.

If, for an embedding of the token $q_i$, all search space have been considered and no match has been identified (712), embedding of the token $q_i$ is compared to target embeddings in a remainder of the complete search space ($C_T$) and the tracker is updated (728).

Figure 8:
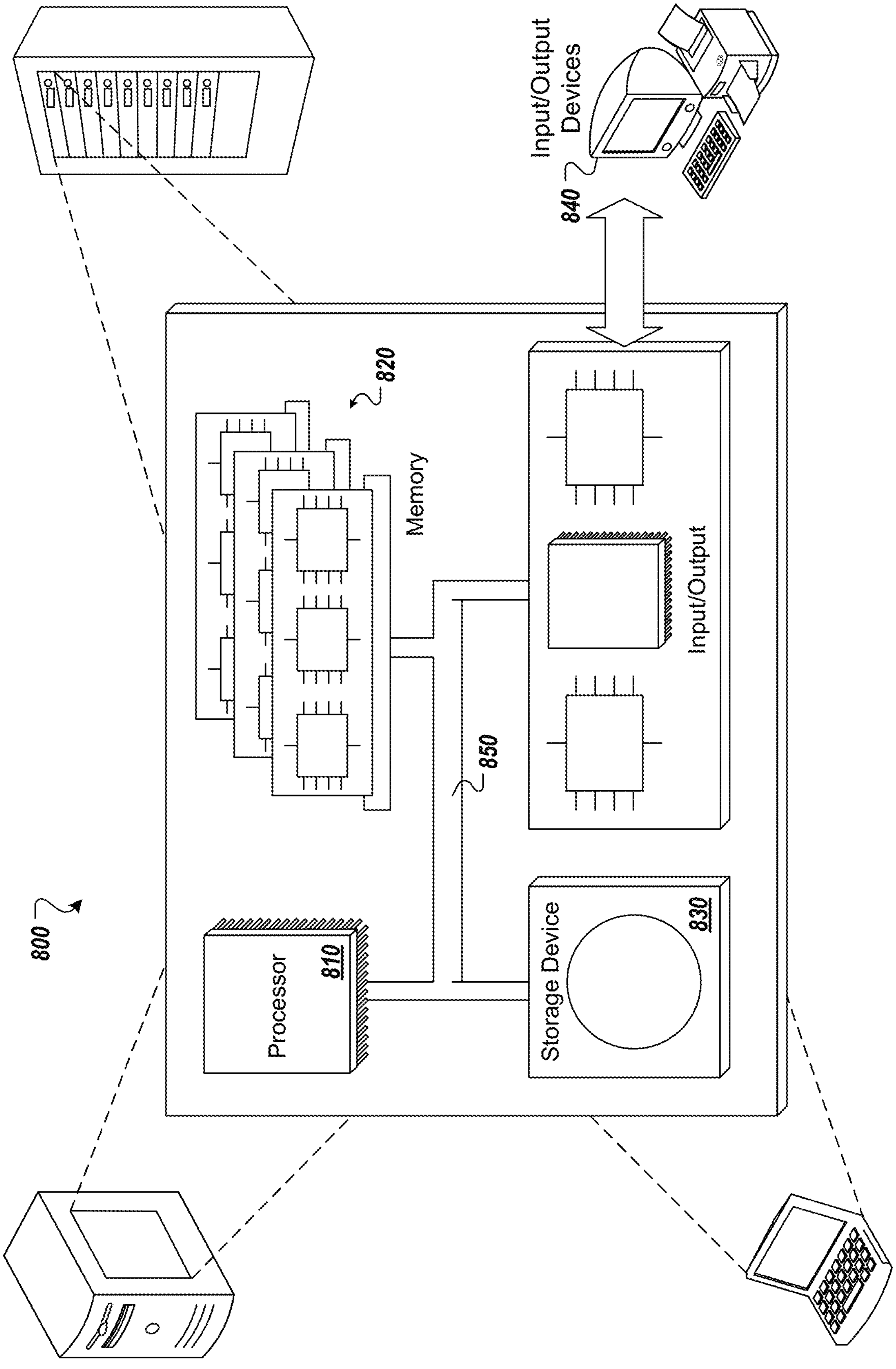
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, 840 are interconnected using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In some implementations, the memory 820 is a volatile memory unit. In some implementations, the memory 820 is a non-volatile memory unit. The storage device 830 is capable of providing mass storage for the system 800. In some implementations, the storage device 830 is a computer-readable medium. In some implementations, the storage device 830 may be a floppy disk device, a hard disk device, an optical disk device, or a tape device. The input/output device 840 provides input/output operations for the system 800. In some implementations, the input/output device 840 includes a keyboard and/or pointing device. In some implementations, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for matching a query item to one or more target items using machine learning (ML) models, the method being executed by one or more processors and comprising:

prior to matching a query item to one or more target items of a superset of target items during inference, providing a set of target items from the superset of target items by:

for a first query item token of the query item:

identifying, within a search space, at least one target item token that is similar to the first query item token, and associating the first query item token with a revised search space within a tracker, the tracker comprising an array data structure that is initialized with a set of null values, associating the first query item token with the revised search space within the tracker comprises replacing a null value with a search space index indicating where the first query item token was found in the search space, and wherein the revised search space is provided in a queue of search spaces, a length of the queue being defined by a window parameter;

determining, based on the length between the items being within a window size of the window parameter, a set of matched item tokens indicating one of a match and a partial match between a query item token and a target item token;

defining the set of target items from the set of matched item tokens; and executing inference to match the query item to one or more target items in the set of target items to provide inference results, the inference results indicating a match between the query item and at least one target item in the set of target items.

2. The method of claim 1, wherein the search space is defined within a search tree comprising a set of nodes, each node representative of a respective target item token in a set of target item tokens.

3. The method of claim 1, wherein the revised search space comprises a search sub-space of the search space.

4. The method of claim 1, further comprising determining that no target item tokens represented in the revised search space is similar to a second query item token, and in response, comparing a second query item token embedding to target item token embeddings of target items tokens included within an alternative search space present in the queue.

5. The method of claim 4, further comprising, for the second query item token comparing a second query item token embedding to target item token embeddings of target items tokens included within the revised search space.

6. The method of claim 1, wherein a first query item token embedding is determined by a first ML model, and the at least one target item token that is similar to the first query item token is identified by comparing the first query item token embedding to target item token embeddings of target items tokens included within the search space.

7. The method of claim 6, wherein, during a training phase, the first ML model is fine-tuned based on sets of perturbations, each set of perturbations corresponding to an item token.

8. The method of claim 1, wherein executing inference to match the query item to one or more target items in the set of target items to provide inference results comprises processing the query item and target items of the set of target items through a second ML model that outputs the inference results.

9. The method of claim 1, wherein a number of target items in the set of target items being less than a number of target items in the superset of target items.

* * * * *